United States Patent
Takano (10) Patent No.: US 10,048,356 B2
(45) Date of Patent: Aug. 14, 2018

(54) DISTANCE MEASURING SYSTEM AND IMAGING SENSOR

(71) Applicant: Panasonic Intellectual Property Management Co., Ltd., Osaka (JP)

(72) Inventor: Haruka Takano, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 433 days.

(21) Appl. No.: 14/965,520

(22) Filed: Dec. 10, 2015

(65) Prior Publication Data

US 2016/0097844 A1   Apr. 7, 2016

Related U.S. Application Data (63) Continuation of application No. PCT/JP2014/003027, filed on Jun. 6, 2014.

(30) Foreign Application Priority Data

Jun. 26, 2013 (JP) ................................ 2013-133672

(51) Int. Cl.
  *G01S 7/48* (2006.01)
  *G01S 7/497* (2006.01)
  (Continued)

(52) U.S. Cl.
  CPC ............ *G01S 7/4865* (2013.01); *G01S 7/497* (2013.01); *G01S 17/10* (2013.01); *G01S 17/89* (2013.01)

(58) Field of Classification Search
  CPC ........ G01S 7/4865; G01S 7/497; G01S 17/10; G01S 17/97
  See application file for complete search history.

(56) References Cited

U.S. PATENT DOCUMENTS

| 5,889,490 A * | 3/1999 | Wachter | .................. G01S 17/10 342/127 |
|---|---|---|---|
| 2005/0162638 A1 | 7/2005 | Suzuki et al. | |
| 2008/0205709 A1 | 8/2008 | Masuda et al. | |

FOREIGN PATENT DOCUMENTS

| JP | 2005-214743 | 8/2005 |
|---|---|---|
| JP | 2008-241695 | 10/2008 |

(Continued)

OTHER PUBLICATIONS

International Search Report of PCT application No. PCT/JP2014/003027 dated Sep. 9, 2014.

*Primary Examiner* — Eric L Bolda
(74) *Attorney, Agent, or Firm* — McDermott Will & Emery LLP (57) ABSTRACT

A TOF (time of flight) type distance measuring system of high accuracy is provided. The distance measuring system includes: a light source unit for emitting light at a timing indicated by an emission signal; a light receiving unit for acquiring RAW data for each pixel from an imaging sensor, by exposing the imaging sensor to the light reflected from an object at a timing indicated by an exposure signal; a TOF calculation unit for supplying a TOF signal indicating the distance from each pixel to the object that is calculated based on the RAW data; a detection unit for detecting the difference between a standard value and the TOF signal for a standard pixel on the imaging sensor, and generating a phase control signal and a fine adjustment signal in accordance with the difference; a correction unit for correcting the TOF signal on the basis of the fine adjustment signal, and outputting the correction result as distance information for each pixel; and a control unit for controlling the phase shift of at least one of the emission signal and the exposure signal on the basis of the phase control signal.

13 Claims, 12 Drawing Sheets

(51) Int. Cl.
    *G01S 17/89*     (2006.01)
    *G01S 17/10*     (2006.01)
    *G01S 7/486*     (2006.01)

(56) References Cited

FOREIGN PATENT DOCUMENTS

| | | |
|---|---|---|
| JP | 2009-014481 | 1/2009 |
| JP | 2011-133320 | 7/2011 |
| JP | 2012-215480 | 11/2012 |

\* cited by examiner

DISTANCE MEASURING SYSTEM AND IMAGING SENSOR

TECHNICAL FIELD

The present disclosure relates to a distance measuring system for acquiring positional information of an object by radiating light and receiving the reflected light.

BACKGROUND ART

Distance measurement can be performed using the fact that the time of flight (TOF), which is the period from the transmission of an optical pulse to the reception of the pulse reflected on an object and returned, depends on the distance to the object. This distance measurement using the TOF method has a problem in which an error occurs in the distance measurement result due to the change of the measurement condition and measurement environment and hence the measurement accuracy reduces.

In Patent Literature 1, in order to suppress the reduction in measurement accuracy, a distance measurement value is calculated on the basis of the exposure amount obtained from each of two exposure pulses of different phases.

CITATION LIST

Patent Literature

PTL 1: Unexamined Japanese Patent Publication No. 2012-215480

SUMMARY OF THE DISCLOSURE

Figure 1:
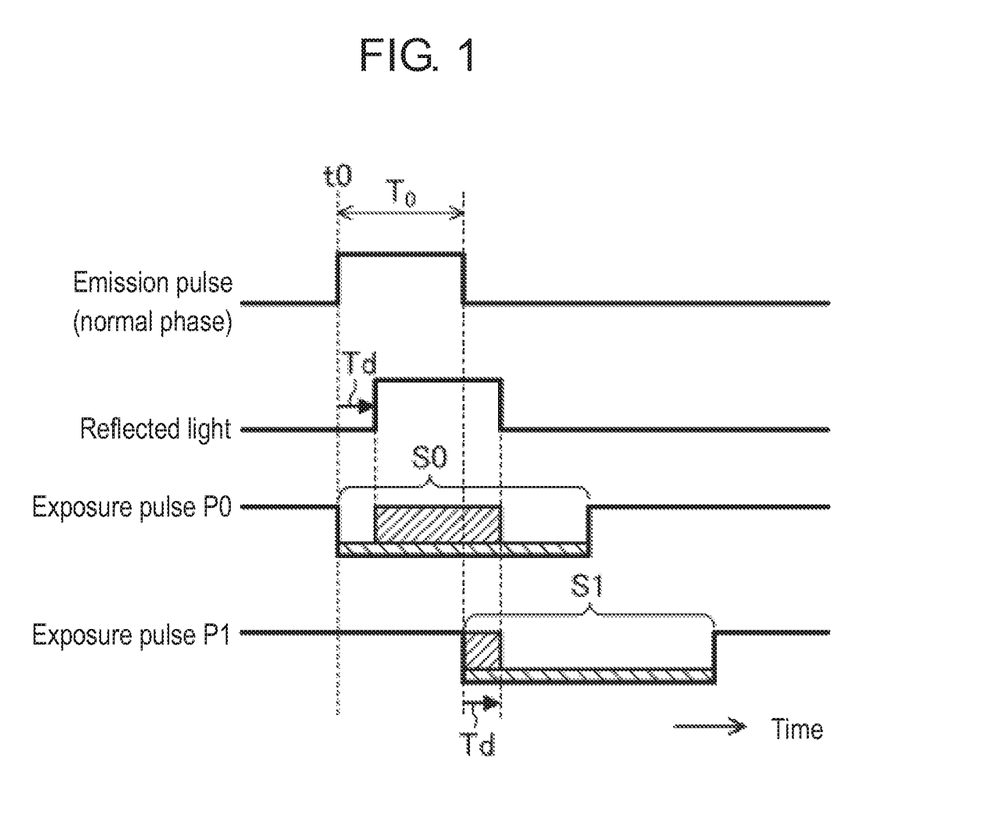
FIG. 1 is a timing chart in a state where the phase of an emission pulse is aligned with the phase of an exposure pulse in a conventional distance measuring system.

FIG. 1 is a timing chart in a state where the phase of an emission pulse is aligned with the phase of an exposure pulse in a conventional distance measuring system. In FIG. 1, an emission pulse that rises at time t0 and has a pulse width of T0 is radiated to an object, and the reflected light from the object enters the distance measuring system after a lapse of period Td. The incident light is converted into a signal charge by an imaging sensor.

Figure 2:
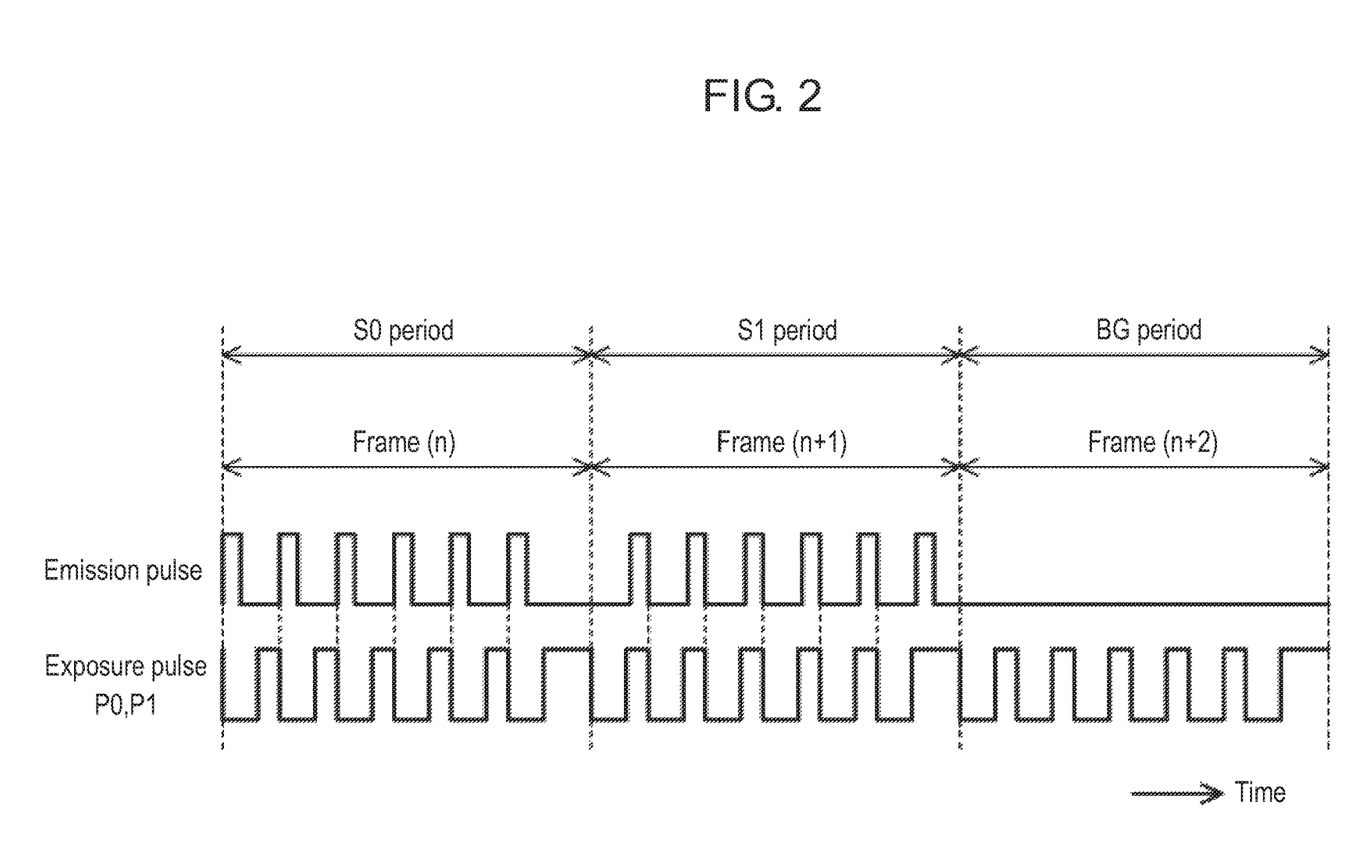
FIG. 2 is a timing chart showing a sequence example of the period of exposure amount S0 by first exposure pulse P0 in FIG. 1, the period of exposure amount S1 by second exposure pulse P1, and the period of exposure amount BG by the background light.

Here, when the distance from the distance measuring system to the object is assumed to be L, period Td corresponds to the time-of-flight of the light of velocity c in a length of 2 L. First exposure pulse P0 falls at the same time as when the emission pulse rises, and has a first exposure period longer than pulse width T0 of the emission pulse. Second exposure pulse P1 falls at the same time as when the emission pulse falls, and has a second exposure period having the same length as that of the first exposure period. In order to detect the offset component caused by background light, the emission pulse is stopped and performs exposure under the same condition as that of first and second exposure pulses P0 and P1 (FIG. 2). Here, the exposure amount in the first exposure period by first exposure pulse P0 is denoted with S0, the exposure amount in the second exposure period by second exposure pulse P1 is denoted with S1, and the exposure amount by the background light is denoted with BG. At this time, S0-BG corresponds to the signal charge (for the reflected light) accumulated in the period T0, and S1-BG corresponds to the signal charge (for the reflected light) accumulated in the period Td. Therefore, distance L can be calculated using equation (1).

$$L = \frac{c \cdot T_o}{2} \times \left(\frac{S1 - BG}{S0 - BG}\right) \quad (1)$$

Figure 3:
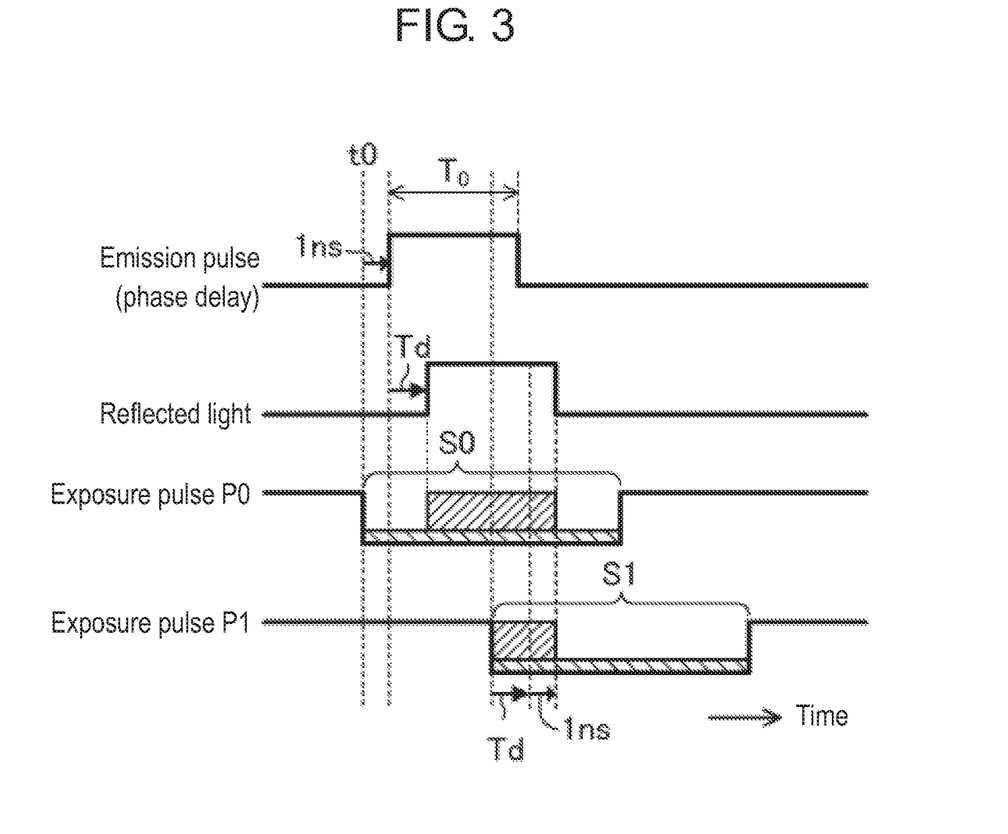
FIG. 3 is a timing chart in the case where the phase of the emission pulse is later than that of the exposure pulse in the conventional distance measuring system.

FIG. 3 is a timing chart in the case where the rising of the emission pulse is 1 ns later than the falling of first exposure pulse P0 in the conventional distance measuring system. In this case, exposure amount S1 in the second exposure period by second exposure pulse P1 is larger than that in the case of FIG. 1 by the amount corresponding to 1 ns. As a result, it is predicted that the calculation result of distance L using equation (1) is longer than that in the case of FIG. 1.

Figure 4:
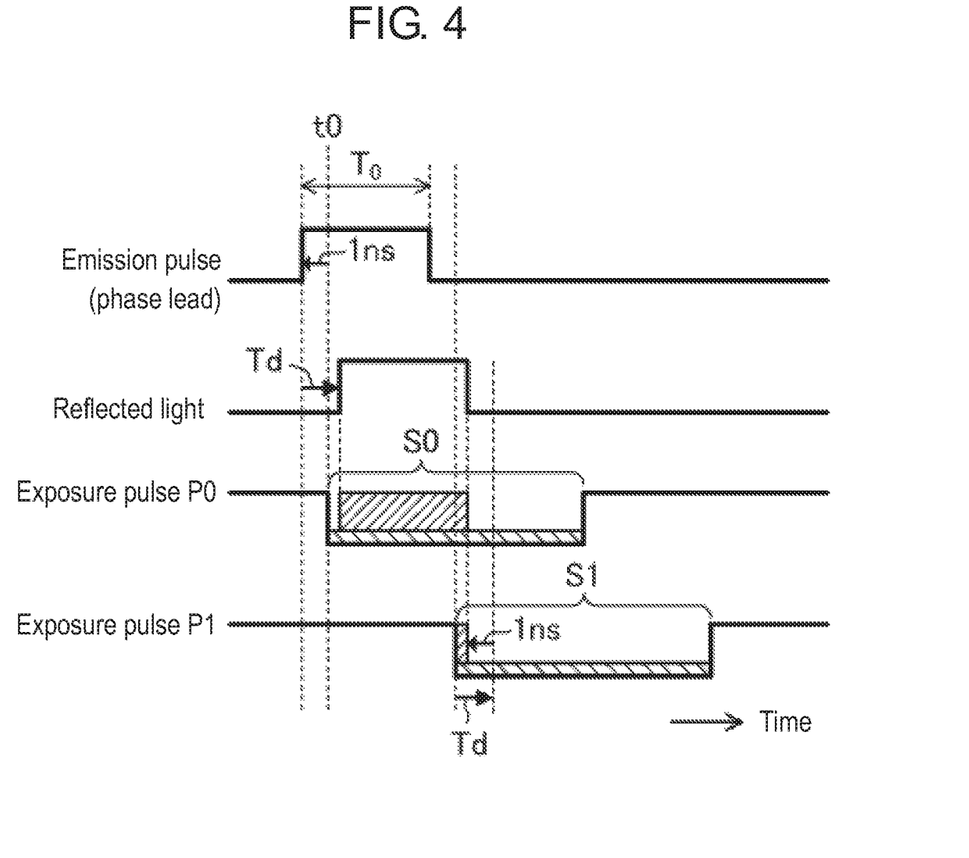
FIG. 4 is a timing chart in the case where the phase of the emission pulse is earlier than that of the exposure pulse in the conventional distance measuring system.

FIG. 4 is a timing chart in the case where the rising of the emission pulse is 1 ns earlier than the falling of first exposure pulse P0 in the conventional distance measuring system. In this case, exposure amount S1 in the second exposure period by second exposure pulse P1 is smaller than that in the case of FIG. 1 by the amount corresponding to 1 ns. As a result, it is predicted that the calculation result of distance L using equation (1) is shorter than that in the case of FIG. 1.

Figure 5:
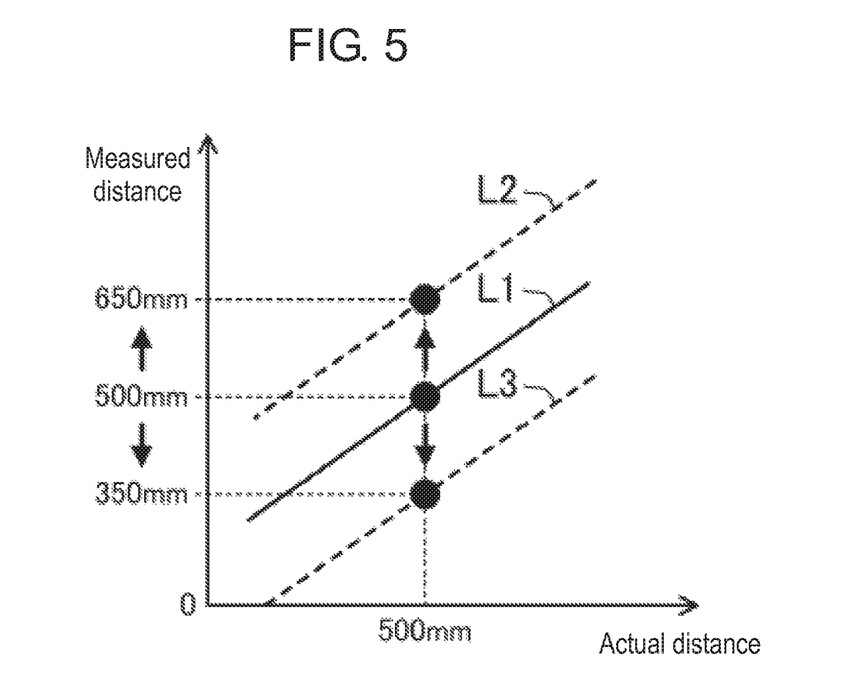
FIG. 5 is a diagram showing that a distance measurement error is caused by the phase shift between the emission pulse and exposure pulse in the conventional distance measuring system.

FIG. 5 is a diagram showing that a distance measurement error is caused by the phase shift between the emission pulse and exposure pulse in the conventional distance measuring system. When the phase of the emission pulse is aligned with that of the exposure pulse as shown in FIG. 1, the relationship between the actual distance from the distance measuring system to the object and a measured distance is expressed as straight line L1. At this time, when the actual distance is assumed to be 500 mm, the measured distance is also 500 mm and the error is 0. While, straight line L2 in FIG. 5 shows the relationship between the actual distance and the measured distance in the case of the phase shift of FIG. 3. In other words, for the actual distance of 500 mm, the measured distance is 650 mm and the error is +150 mm. Straight line L3 in FIG. 5 shows the relationship between the actual distance and the measured distance in the case of the phase shift of FIG. 4. In other words, for the actual distance of 500 mm, the measured distance is 350 mm and the error is −150 mm.

Even when the phase relationship between the emission pulse and exposure pulse at the beginning of the operation of the distance measuring system is the same as the assumed relationship, the phase relationship between the emission pulse and exposure pulse changes with time due to the influence of a temperature drift or voltage drift. Therefore, this change causes an error in the distance measurement result.

Figure 6:
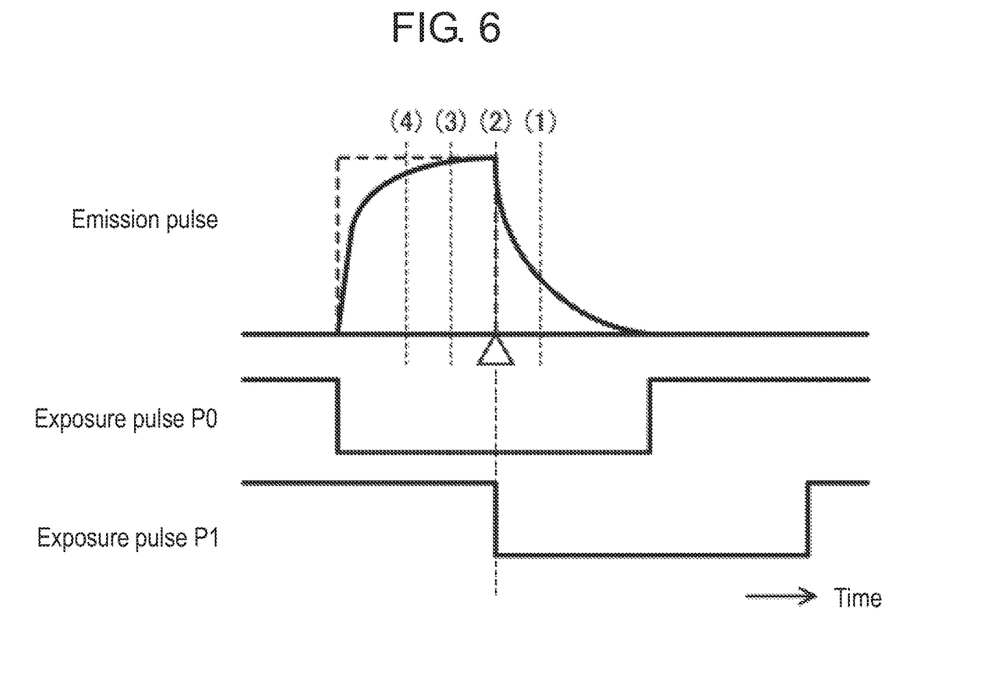
FIG. 6 is a waveform chart showing the state where waveform distortion occurs in the emission pulse in the conventional distance measuring system.

FIG. 6 is a waveform chart showing the state where waveform distortion occurs in the emission pulse in the conventional distance measuring system. In many cases, the actual emission pulse waveform is not an ideal rectangular wave shown by the broken line in FIG. 6, and is distorted as shown by the solid line in FIG. 6. FIG. 6 shows the state where second exposure pulse P1 falls at timing (2) when the reduction in the emission pulse starts.

Figure 7:
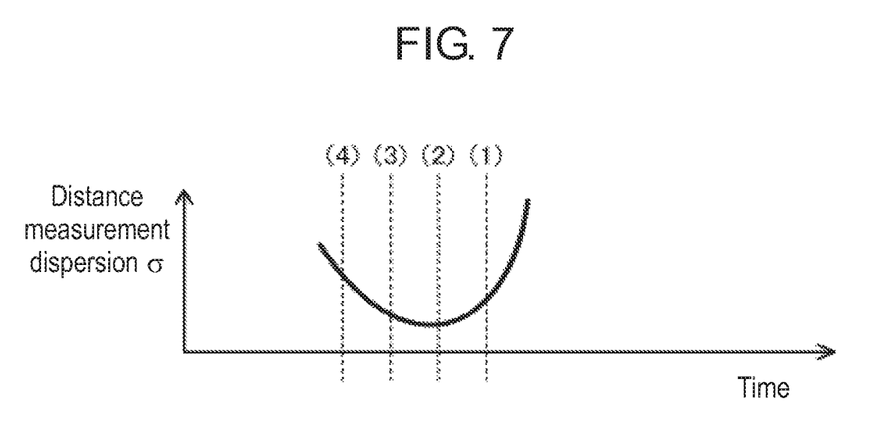
FIG. 7 is a diagram showing that the variation in the distance measurement dispersion is caused by the waveform distortion of the emission pulse shown in FIG. 6.

FIG. 7 is a diagram showing that the variation in the distance measurement dispersion is caused by the waveform distortion of the emission pulse shown in FIG. 6. As the starting timing of the second exposure period by second exposure pulse P1 changes in the sequence of (1)→(2)→(3)→(4) in FIG. 6, distance measurement dispersion σ varies in the sequence of (1)→(2)→(3)→(4) in FIG. 7. In this example, when second exposure pulse P1 falls at timing (2), distance measurement dispersion σ becomes minimum. In other words, this phenomenon shows that, when the emission pulse has waveform distortion, an optimum phase exists between the emission pulse and exposure pulse and a phase shift from the optimum phase degrades the distance measurement performance.

The purpose of the present disclosure is to provide a TOF type distance measuring system that has high accuracy, corrects the influence of the phase shift between the emission pulse and exposure pulse by phase adjustment, and further can correct even the distance measurement error that cannot be corrected by the phase adjustment.

In order to achieve the purpose, the TOF type distance measuring system of the present disclosure includes the following components:

a light source unit for emitting light at a timing indicated by an emission signal;

a light receiving unit for acquiring RAW data for each pixel from an imaging sensor, by exposing the imaging sensor to the light reflected from an object at a timing indicated by an exposure signal;

a TOF calculation unit for supplying a TOF signal indicating the distance from each pixel to the object that is calculated based on the RAW data;

a detection unit for detecting the difference between a standard value and the TOF signal for a standard pixel on the imaging sensor, and generating at least one of a phase control signal and a fine adjustment signal in accordance with the difference; and a correction control unit that, when the fine adjustment signal is generated, serves as a correction unit for correcting the TOF signal on the basis of the fine adjustment signal and outputting the correction result as distance information for each pixel, and, when the phase control signal is generated, serves as a control unit for controlling the phase shift of at least one of the emission signal and exposure signal on the basis of the phase control signal.

In the present disclosure, the distance measurement error can be accurately corrected which is caused by the individual difference dispersion of the components of the distance measuring system and the phase shift between the emission pulse and exposure pulse due to the temperature/voltage drift. Furthermore, the optimum phase between the emission pulse and exposure pulse can be kept, and hence the accurate distance measurement result can be obtained.

DESCRIPTION OF EMBODIMENTS

Hereinafter, exemplary embodiments of the present invention are described in detail with reference to the accompanying drawings.

First Exemplary Embodiment

Figure 8:
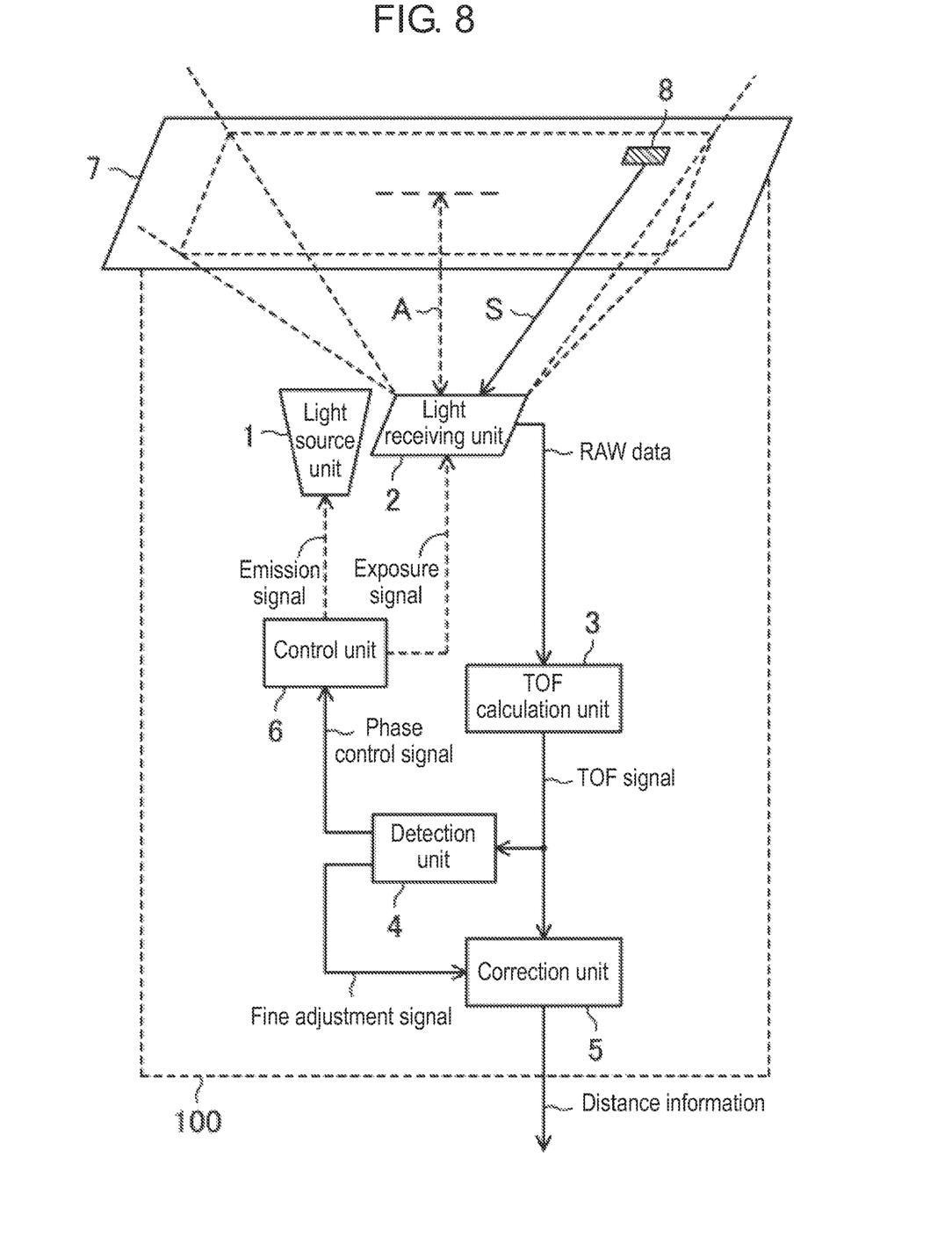
FIG. 8 is a block diagram showing the configuration of a distance measuring system in accordance with a first exemplary embodiment of the present disclosure.

FIG. 8 is a block diagram showing the configuration of a distance measuring system in accordance with a first exemplary embodiment of the present disclosure. Distance measuring system 100 of FIG. 8 includes light source unit 1, light receiving unit 2, TOF calculation unit 3, detection unit 4, correction unit 5, control unit 6, transparent plate 7, and marker 8. Transparent plate 7 is made of glass, for example.

Control unit 6 outputs an emission signal and an exposure signal. When the emission signal is at the H level, light source unit 1 emits infrared light, for example. Only in the period when the exposure signal is at the L level, light receiving unit 2 exposes an imaging area sensor to the light reflected from an object, and outputs, as RAW (raw) data, the charge amount obtained by the exposure of each pixel in the L period. TOF calculation unit 3 calculates the distance of each pixel using equation (1) on the basis of the RAW data, and outputs the distance measurement value as a TOF signal. Detection unit 4 detects difference D of the TOF signal for a standard pixel corresponding to marker 8 from standard value R. When difference D is more than 150 mm, detection unit 4 outputs one H-pulse as a phase control signal for controlling the phase of the emission pulse. When difference D is less than −150 mm, detection unit 4 outputs two H-pulses as the phase control signal. When difference D is −150 mm or more and +150 mm or less, detection unit 4 does not output an H-pulse as the phase control signal, but outputs difference D as a fine adjustment signal for correcting the error of the TOF signal that occurs due to the phase shift. When one H-pulse is input as the phase control signal, control unit 6 advances the phase of the emission signal by 1 ns. When two H-pulses are input, control unit 6 delays the phase of the emission pulse by 1 ns. Correction unit 5 outputs the result obtained by subtracting the fine adjustment signal from the TOF signal, and the result is used as distance information including the corrected distance measurement value for each pixel.

Marker 8 is disposed within the angle of view of light receiving unit 2 on the surface of transparent plate 7 fixed to a fixed position that is separated from light receiving unit 2 by distance A. The standard pixel used by detection unit 4 is a pixel corresponding to marker 8 on the imaging area sensor of light receiving unit 2. Standard value R used by detection unit 4 is a value that is calculated on the basis of optical path distance S from light receiving unit 2 to marker 8.

Figure 9:
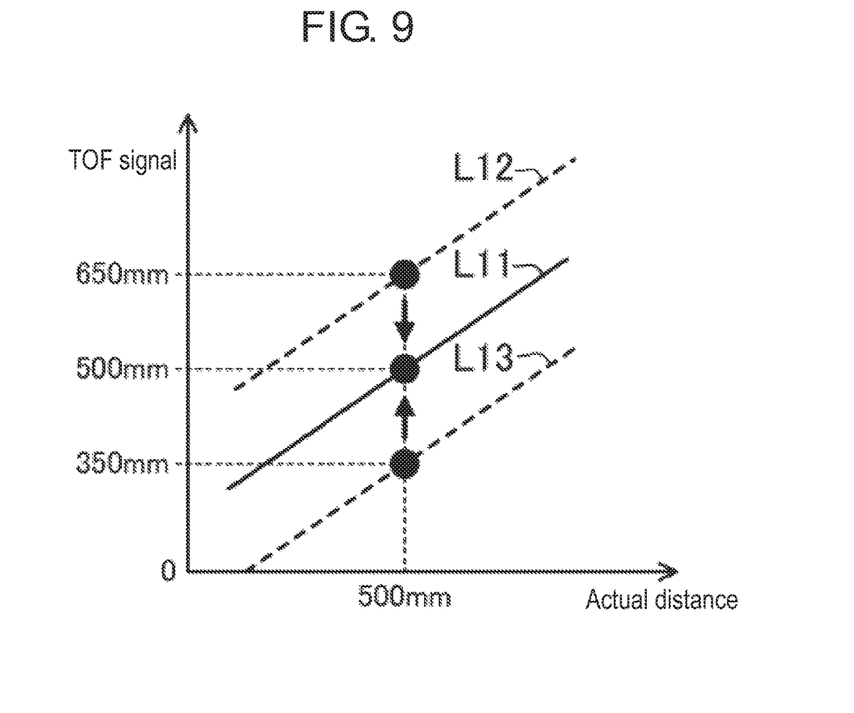
FIG. 9 is a diagram showing that a TOF signal is corrected in response to a phase control signal coming from a detection unit in the distance measuring system of FIG. 8.

FIG. 9 is a diagram showing that the TOF signal is corrected in response to the phase control signal from detection unit 4 in distance measuring system 100 of FIG. 8. In the state where there is no phase shift between the emission pulse and first exposure pulse P0 and the rising timing of the emission pulse is aligned with the falling timing of first exposure pulse P0 as shown in FIG. 1, the distance measurement relationship between the actual distance and the TOF signal is expressed as straight line L11. In other words, when the actual distance corresponding to standard value R of marker 8 is assumed to be 500 mm, the value of the TOF signal of the standard pixel is obtained as 500 mm. When the rising of the emission pulse is 1 ns later than the falling of first exposure pulse P0 as shown in FIG. 3, the distance measurement relationship between the actual distance and the TOF signal is expressed as straight line L12. In this case, an error of +150 mm occurs in the TOF signal with respect to the actual distance of 500 mm of marker 8. Therefore, when the TOF signal of the standard pixel is more than 650 mm, detection unit 4 advances the phase of the emission signal by 1 ns, thereby correcting the distance measurement relationship of straight line L12 and returning it to the distance measurement relationship of straight line L11. While, when the rising of the emission pulse is 1 ns earlier than the falling of first exposure pulse P0 as shown in FIG. 4, the distance measurement relationship between the actual distance and the TOF signal is expressed as straight line L13. In this case, an error of −150 mm occurs in the TOF signal with respect to the actual distance of 500 mm of marker 8. Therefore, when the TOF signal of the standard pixel is less than 350 mm, detection unit 4 delays the phase of the emission signal by 1 ns, thereby correcting the distance measurement relationship of straight line L13 and returning it to the distance measurement relationship of straight line L11.

Figure 10:
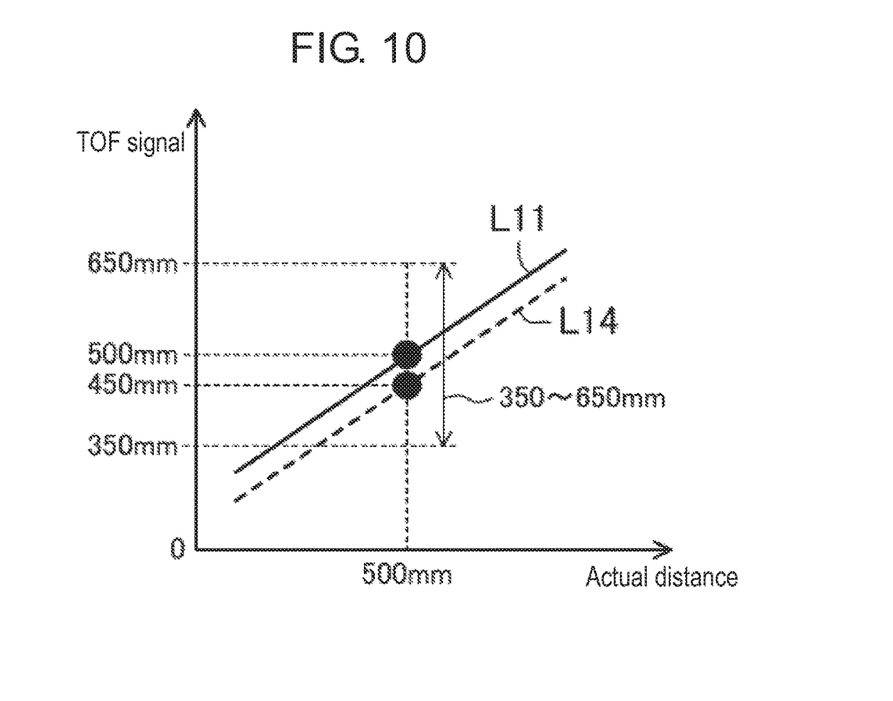
FIG. 10 is a diagram showing that the TOF signal is corrected in response to a fine adjustment signal coming from the detection unit in the distance measuring system of FIG. 8.

FIG. 10 is a diagram showing that the TOF signal is corrected in response to the fine adjustment signal coming from detection unit 4 in distance measuring system 100 of FIG. 8. When the TOF signal of the standard pixel is less than 650 mm and more than 350 mm as shown in FIG. 10, detection unit 4 outputs, as the fine adjustment signal (−50 in the example of FIG. 10), the result obtained by subtracting standard value R (500 mm) from the TOF signal (450 mm in the example of FIG. 10). At this time, correction unit 5 corrects the distance measurement relationship of straight line L14 to the distance measurement relationship of straight line L11, by subtracting the fine adjustment signal (−50) that is calculated by detection unit 4 from the TOF signal that is calculated using the distance measurement relationship of straight line L14. Then, correction unit 5 outputs distance information.

Thus, in the first exemplary embodiment of the present disclosure, the distance measurement error can be accurately corrected and output which is caused by the individual difference dispersion of the components of the distance measuring system 100 or the phase shift between the emission pulse and exposure pulse due to the temperature/voltage drift. The optimum phase between the emission pulse and exposure pulse can be kept, and hence the accurate distance measurement result can be obtained.

The standard pixel and standard value R may be externally controllable. Thus, even when the position of marker 8 is changed, only change of the set value is required.

Figure 11:
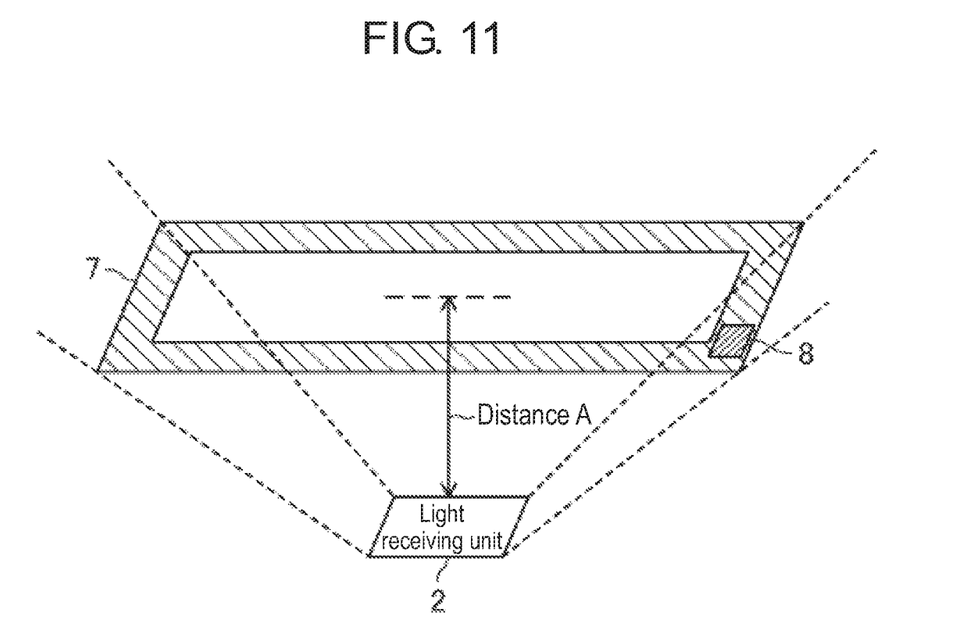
FIG. 11 is a block diagram showing a first modified example of the distance measuring system of FIG. 8.

Marker 8 may be disposed in a low reflection frame of transparent plate 7 within the angle of view of light receiving unit 2 as shown in FIG. 11. Thus, the number of components can be reduced, and the influence of the stray light caused by the reflected light inside transparent plate 7 or casing can be reduced.

Figure 12:
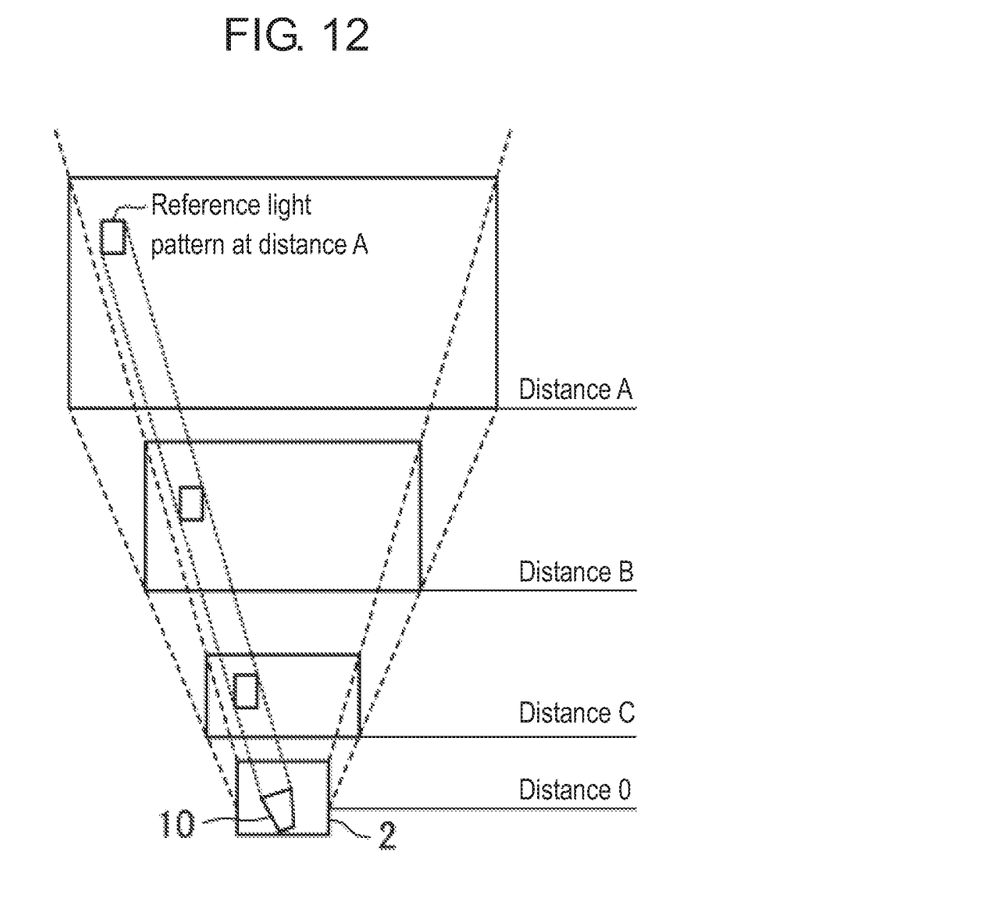
FIG. 12 is a block diagram showing a second modified example of the distance measuring system of FIG. 8.

As shown in FIG. 12, the following method may be employed: reference light source unit 10 is disposed, reference light is radiated to the region within the angle of view corresponding to the standard pixel, and standard value R is determined in response to the number of pixels having received the reflected light of the reference light. This case utilizes the fact that, as the distance from light receiving unit 2 to transparent plate 7 varies in the sequence of A, B, and C, the number of pixels constituting a reference light pattern varies. Thus, the accuracy of the distance measurement can be improved without using actual marker 8.

In addition, the measurement result of a thermometer may be input to detection unit 4, and the phase control signal may be controlled in response to the variation in temperature.

A plurality of standard pixels may correspond to marker 8, and a plurality of standard values R may correspond to marker 8. In this case, the phase adjustment can be performed by average or majority determination of differences of the standard pixels.

The following method may be employed: two markers of different distances are set, difference DD of each of the TOF signals is detected, the standard deviation a of the TOF signal corresponding to one standard pixel is detected, and the phase shift between the emission pulse and exposure pulse is controlled so that the phase provides a minimum a/DD. The TOF signal of the standard pixel that has the minimum a/DD may be set as standard value R of the corresponding standard pixel. Thus, accurate distance measurement that does not depend on variation in emission waveform can be achieved.

Detection unit 4 may be set so that, when the difference between the RAW data of the standard pixel and set threshold B is more than a predetermined value, detection unit 4 does not perform the correction for the standard pixel. This setting can prevent malfunction from occurring when marker 8 greatly moves from a predetermined position, for example.

Control unit 6 may control the number of outputs of the emission signal and exposure signal on the basis of the difference between the RAW data of the standard pixel and set threshold B. Thus, even when the emission intensity of light source unit 1 and the sensitivity of light receiving unit 2 have individual difference dispersion, distance measurement can be performed at the optimum light quantity.

Control unit 6 may control the phase shift of the exposure signal instead of the phase shift of the emission signal. Control unit 6 may control the phase shifts of both the emission signal and the exposure signal.

Transparent plate 7 does not need to be parallel with the light receiving surface of light receiving unit 2.

Second Exemplary Embodiment

Figure 13:
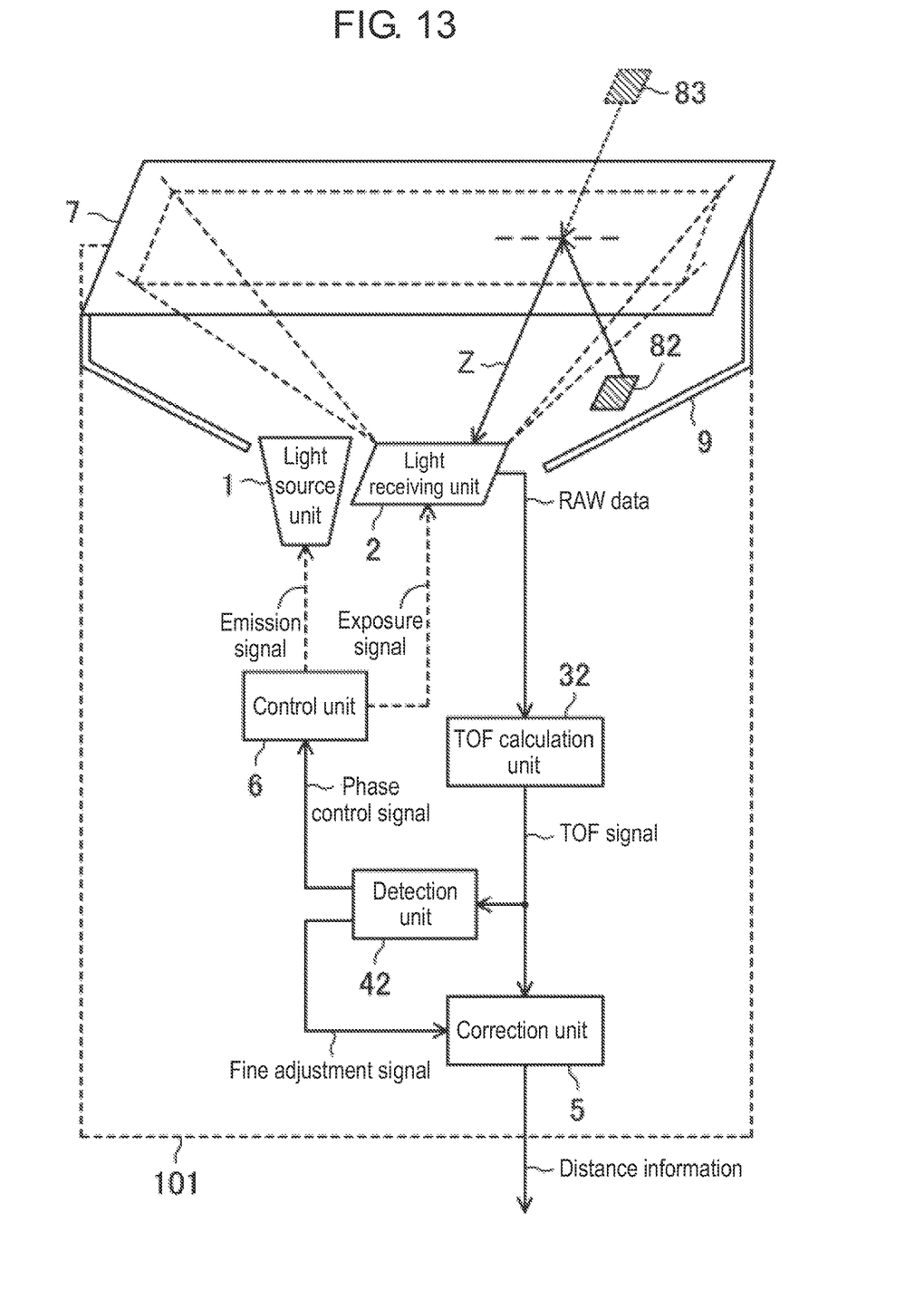
FIG. 13 is a block diagram showing the configuration of a distance measuring system in accordance with a second exemplary embodiment of the present disclosure.

FIG. 13 is a block diagram showing the configuration of a distance measuring system in accordance with a second exemplary embodiment of the present disclosure. The configuration of distance measuring system 101 of FIG. 13 is obtained by modifying distance measuring system 100 of the first exemplary embodiment in the following manner:

TOF calculation unit 3 is changed to TOF calculation unit 32;

detection unit 4 is changed to detection unit 42; and entity 82 of a marker is disposed on a part of the space surrounded by transparent plate 7 and low reflection plate 9 covering the periphery of light receiving unit 2, especially entity 82 of the marker is disposed outside the angle of view of light receiving unit 2.

In the state where no measuring object exists within the angle of view of light receiving unit 2, TOF calculation unit 32 holds, as S0A and S1A, the measured values of exposure amounts S0 and S1 of the standard pixel. Regarding the pixels other than the standard pixel, TOF calculation unit 32 calculates the distance of each pixel on the basis of the RAW data using equation (1), and outputs a TOF signal. Regarding the standard pixel, TOF calculation unit 32 calculates the distance of the pixel using equation (2) on the basis of measured exposure amounts S0A and S1A, and outputs a TOF signal.

$$L = \frac{c \cdot T_0}{2} \times \left( \frac{S1 - S1A - BG}{S0 - S0A - BG} \right) \quad (2)$$

The standard pixel used by detection unit 42 is a pixel corresponding to virtual image 83 of the marker. Standard value R used by detection unit 42 is a value calculated based on optical path distance Z from light receiving unit 2 to entity 82 of the marker or optical path distance Z from light receiving unit 2 to virtual image 83 of the marker.

When S0-S0A of the standard pixel is smaller than the set value, detection unit 42 holds difference D as difference D0, and outputs the phase control signal and fine adjustment signal under the same condition as that of detection unit 4 of the first exemplary embodiment. When S0-S0A of the standard pixel is larger than the set value, detection unit 42 outputs the phase control signal at a level fixed to L and outputs difference D0 as the fine adjustment signal.

Thus, the second exemplary embodiment of the present disclosure allows the distance measurement at all pixels within the angle of view while keeping the advantage equivalent to that of the first exemplary embodiment.

The present disclosure is not limited to the configuration of the first exemplary embodiment or second exemplary embodiment. For example, as the imaging area sensor of light receiving unit 2, any one of a charge coupled device (CCD) sensor and a complementary metal oxide semiconductor (CMOS) may be employed.

INDUSTRIAL APPLICABILITY

As discussed above, the distance measuring system of the present disclosure can accurately correct the distance measurement error that is caused by the phase shift between an emission pulse and an exposure pulse. The distance measuring system is useful as a system for acquiring positional information of an object.

REFERENCE MARKS IN THE DRAWINGS

1 light source unit
2 light receiving unit
3, 32 TOF calculation unit
4, 42 detection unit
5 correction unit
6 control unit
7 transparent plate
8 marker
9 low reflection plate
82 entity of marker
83 virtual image of marker
100, 101 distance measuring system

The invention claimed is:

1. A TOF (time of flight) distance measuring system comprising:
    a light source unit for emitting light at a timing indicated by an emission signal;
    a light receiving unit for acquiring RAW data for each of pixels from an imaging sensor, by exposing the imaging sensor to light reflected from an object at a timing indicated by an exposure signal;
    a TOF calculation unit for supplying a TOF signal indicating a distance from each of the pixels to the object, the distance being calculated based on the RAW data;
    a detection unit for detecting a difference between a standard value and the TOF signal for a standard pixel, of the pixels, on the imaging sensor, and generating at least one of a phase control signal and a fine adjustment signal in accordance with the difference; and
    a correction control unit serving as a correction unit when the fine adjustment signal is generated and serving as a control unit when the phase control signal is generated, the correction unit correcting the TOF signal based on the fine adjustment signal and outputting a correction result as distance information for each of the pixels, the control unit controlling a phase shift of at least one of the emission signal and the exposure signal based on the phase control signal.

2. The distance measuring system according to claim 1, further comprising a marker disposed at a fixed position with respect to the light source unit and the light receiving unit,
    wherein the standard pixel receives light from the marker, and
    wherein the standard value is calculated based on a known optical path distance from the light receiving unit to the marker.

3. The distance measuring system according to claim 2, wherein
    the marker is fixed at the fixed position with respect to the light source unit and the light receiving unit.

4. The distance measuring system according to claim 2, further comprising a transparent plate fixed at a fixed position with respect to the light source unit and the light receiving unit,
    wherein the marker is disposed on a surface of the transparent plate.

5. The distance measuring system according to claim 2, further comprising a transparent plate fixed at a fixed position with respect to the light source unit and the light receiving unit,
    wherein the marker is disposed outside an angle of view of the light receiving unit so that a virtual image of the marker is generated within the angle of view of the light receiving unit by reflection on a surface of the transparent plate.

6. The distance measuring system according to claim 1, wherein
    in a state where the object does not exist, the TOF calculation unit previously holds the RAW data, which has been received from the light receiving unit, for the standard pixel as standard RAW data, and
    in a normal operation where the object exists, the TOF calculation unit calculates a distance from the distance measuring system to the object for the standard pixel based on a result obtained by subtracting the standard RAW data from the RAW data received from the light receiving unit.

7. The distance measuring system according to claim 2, wherein
a plurality of the standard pixels each of which corresponds to the marker are disposed on the imaging sensor, and
the standard value is set to each of the plurality of standard pixels.

8. The distance measuring system according to claim 1, wherein
at least one of the standard pixel and the standard value is externally changeable.

9. The distance measuring system according to claim 1, further comprising a plurality of markers disposed at mutually different distances from the light receiving unit,
wherein the detection unit generates the phase control signal in accordance with a difference between each of the plurality of standard values and the TOF signal for each of the plurality of standard pixels and a dispersion amount of the TOF signal for one of the plurality of standard pixels that are on the imaging sensor and correspond to the plurality of markers.

10. The distance measuring system according to claim 1, further comprising:
a transparent plate fixed at a fixed position with respect to the light source unit and the light receiving unit; and
a reference light source unit for radiating reference light to a predetermined range on the transparent plate,
wherein the standard value is determined based on a number of pixels in an image obtained on the imaging sensor by reflection of the reference light on a surface of the transparent plate.

11. The distance measuring system according to claim 1, wherein
when a difference between the RAW data of the standard pixel and a predetermined threshold is larger than a predetermined value, the detection unit does not generate the phase control signal or the fine adjustment signal at the standard pixel.

12. An imaging sensor of a light receiving unit used for a TOF distance measuring system, the TOF distance measuring system comprising:
a light source unit for emitting light at a timing indicated by an emission signal;
the light receiving unit for acquiring RAW data for each of pixels from the imaging sensor;
a TOF calculation unit for supplying a TOF signal indicating a distance from each of the pixels to an object, the distance being calculated based on the RAW data;
a detection unit for detecting a difference between a standard value and the TOF signal for a standard pixel, of the pixels, on the imaging sensor, and generating at least one of a phase control signal and a fine adjustment signal in accordance with the difference;
a correction control unit serving as a correction unit when the fine adjustment signal is generated and serving as a control unit when the phase control signal is generated, the correction unit correcting the TOF signal based on the fine adjustment signal and outputting a correction result as distance information for each of the pixels, the control unit controlling a phase shift of at least one of the emission signal and an exposure signal based on the phase control signal; and
a marker disposed at a fixed position with respect to the light source unit and the light receiving unit,
wherein the imaging sensor is exposed to light reflected from the object at a timing indicated by the exposure signal, and includes the standard pixel for receiving light from the marker.

13. The imaging sensor according to claim 12, further comprising a plurality of the standard pixels each of which corresponds to the marker,
wherein the standard value calculated based on a known optical path distance from the light receiving unit to the marker is set to each of the plurality of standard pixels.

* * * * *